US005922373A

United States Patent [19]
Johnston

[11] Patent Number: 5,922,373
[45] Date of Patent: *Jul. 13, 1999

[54] PROCESS FOR PREPARING A SOY PROTEIN FEED WITH ENHANCED NUTRITIONAL VALUE

[75] Inventor: Charles Johnston, Wooster, Ohio

[73] Assignee: The Ohio State University, Columbus, Ohio

[*] Notice: This patent is subject to a terminal disclaimer.

[21] Appl. No.: 08/851,434

[22] Filed: May 5, 1997

[51] Int. Cl.$^6$ .................................................. A23L 1/00
[52] U.S. Cl. ............................... 426/2; 426/21; 426/630; 426/19; 426/28
[58] Field of Search ................................ 426/2, 21, 630, 426/19, 28

[56] References Cited

U.S. PATENT DOCUMENTS

| | | | |
|---|---|---|---|
| 3,157,513 | 11/1964 | Allen et al. | 426/18 |
| 3,640,723 | 2/1972 | Uhlig et al. | 99/9 |
| 3,934,041 | 1/1976 | Snyder | 426/69 |
| 4,079,155 | 3/1978 | Kakade | 426/2 |
| 4,132,808 | 1/1979 | Kakade | 426/2 |
| 4,265,916 | 5/1981 | Skoch et al. | 426/74 |
| 4,377,602 | 3/1983 | Conrad | 126/656 |
| 4,378,376 | 3/1983 | Wagner et al. | 426/41 |
| 4,450,176 | 5/1984 | Stahel | 426/2 |
| 4,543,264 | 9/1985 | Stahel | 426/2 |
| 4,666,719 | 5/1987 | Spiller | 426/18 |
| 5,395,623 | 3/1995 | Kovach | 426/28 |
| 5,565,225 | 10/1996 | Johnston | 426/2 |

OTHER PUBLICATIONS

Smith, et al., 1975, " The effect of different feeds, including those containing soya–bean products . . . ", *Br. J. Nutr.*, 33: 329–349.

Westland, et al., 1979, Proceedings of the Nutrition Society, *The Nutrition Society*, 38: 73 A.

Kilshaw, et al., 1979, "Gastrointestinal allergy to soya–bean protein in preruminant calves", *Research in Veterinary Science*, 27: 366–371.

Kilshaw, et al., 1979, "Gastrointestinal allergy to soybean protein in preruminant calves", *Research in Veterinary Science*, 27: 361–365.

Kilshaw, et al., 1980, "Passage of ingested protein into the blood during gastrointestinal hypersensitivity reactions", *Clin. Exp. Immunol.*, 41:575–582.

Sissons, et al., 1979, "The effect of giving feeds containing soya–bean meal treated or extracted . . . " *Br. J. Nut* 42:477–485.

Barratt, et al., 1978, "Antibody mechanisms implicated in digestive disturbances", *Clin. Exp. Immunol.*, 31: 305–312.

Barratt, et al., 1979, "Immunoglobulin classes implicated in intestinal disturbances . . . " *J. Immunol.*, 123: 676–680.

Stevenson, et al., 1979, "Plant protein effects on some immune responses in the preruminant calf", *Canadian Society of Animal Science (Abst.)*. p. 801.

Sissons, et al., 1982, "Ethanol Denaturation of Soya Bean Protein Antigens" *J. Sci. Food Agric.*, 33: 706–710.

Sissons, et al., 1982, "Prediction of the suitability of soya–bean products . . . " *Br. J. Nutr.*, 47: 311–318.

Sissons, et al, 1982, "Effects of soya–bean products on digestive processes . . . " *Proc. Nutr. Soc.*, 41: 53–61.

Sissons, et al., 1984, "Survival of dietary antigens in the digestive tract of calves . . . " *Research in Veterinary Science*, 37: 242–246.

Miller, et al., 1984, "Immune hypersensitivity and post weaning diarrhea in the pig", *Proc. Nutri. Soc.*, 43: 116.

Dawson, et al., 1988, "Soy protein concentrate and heated soy flours as protein sources . . . ", *J. Diary Sci.*, 71: 1301–1309.

Klasing, et al., 1988, "Hypersensitivity to dietary soy protein", *PSA and SPSS (Abstract)*, 67: 104.

Klasing, et al., 1988, "Influence of acute feed deprivation or excess feed intake . . . " *Poultry Sciences*, 67: 626–634.

Li, et al. 1990, "Transient hypersensitivity to soybean meal in early weaned pig", *J. Anim. Sci.*, 68: 1790–1799.

Li, et al., 1991, "Interrelationship between hypersensitivity to soybean proteins . . . " *J. Anim. Sci.*, 69: 4062–4069.

Li, et al. 1991, "Measuring suitability of soybean products for early weaned pigs . . . " *J. Anim. Sci.*, 69: 3299–3307.

Immunopatholigical Mechanisms. Merck Veterinary Manual, Sixth Edition pp. 410–424.

Thanh, et al., 1976," Major proteins of soybean seeds", *J. Agric. Food Chem.*, 24: 1117–1121.

Lei, et al., 1983, "Two–dimensional electrophoretic analysis of soybean proteins", *J. Agric. Food Chem.*, 31: 963–968.

Porter, et al., 1987, "Inter–relationship between mucosal and systemic immunity . . . " *Adv. Exp. Med. Biol.*, 216B: 901–909.

Stokes, C.R., 1984, "Induction and control of intestinal immune responses" pp. 97–141 in T.J. Newby, et al eds., C.R.C. Press, F.4.

Bainter, et al., 1993, "Fate of the aninutritive proteins of soya–bean in the ovine gut", *J. Vet. Med.*, A40: 427–431.

Ge, et al., 1993, "Predigestion of soybean proteins with immobilized trypsin for infant formula" *App. Biochem & Biotech.*, 43: 199–209.

Lalles, J.P., 1993, "Nutritional and antinutritional aspects of soybean and field pea proteins . . . " *Livestock Pro Sci.*, 34: 181–202.

Mir, et al., 1991, Nutritional performance of calves fed milk replacers containing processed soybean products *Can. J. Anim. Sci.*, 71: 97–106.

Newby, et al., 1976, "The nature of the local immune systems of the bovine small intestine" *Immunology*, 31 475–480.

Srihara, et al., 1982, "Effect of processing and peptic digestion on the activity of soybean antigens" *J. Dairy Sc* 65: (Abstract) 122.

Fermentation Technology in Microbial Technology, 1979, Sec. Ed. vol. II, Ed. H. J. Peppler and D. Perlman pp. 1–153.

Stokes, et al., The induction of gut damage as a result of transient immune hypersensitivity to dietary antigens *Proc. Nutr. Soc.*, 43: 117A.

Microbial Technology, 2nd Ed., vol. II, Chapter 4, "Mold–Modified Foods" copyright 1979, pp. 95–129.

Heppell, et al., 1987, "A comparison of the antigenicity of soya–bean–based infant formulas", *Br. J. Nutr.*, 5: 393–403.

Heppell, et al., 1989, "Sensitisation of preruminant calves and piglets to antigenic protein in early weaning diets: . . . ", *Research in Veterinary Science*, 47: 257–262.

Lalles, et al., 1990, "Changes in Ruminal and Intestinal Digestion During and After Weaning in Dairy calves for concentrate diets . . . ", *Livestock Production Science.*, 24: 129–142.

Microbial Technology, 2nd Ed., vol. II, Chapter 5, "Wine", Copyright 1979, pp. 131–153.

*Primary Examiner*—Chhaya D. Sayala
*Attorney, Agent, or Firm*—Calfee, Halter & Griswold LLP

[57] ABSTRACT

The present invention provides a novel method for making a modified soy flour feed which is useful as a protein source in the diets of animals, particularly in the diet of young animals. The method for producing the modified soy flour feed, referred to hereinafter as "MSF feed", comprises the following steps: combining soy flour, sugar and liquid to provide a mixture; gelatinizing the soy flour in the mixture; then reacting yeast with the mixture preferably at a temperature of from about 60° F. to about 125° F. for a time sufficient to reduce the allergenic properties of the soy flour; and terminating the chemical reactions. Preferably, the yeast is added to the gelatinized mixture at a weight which is from about 0.25 to about 15%, by weight, of the combined soy flour-sugar weight. Unlike conventional soy flour, the MSF feed produced by this process does not induce diarrhea, poor growth or weight loss associated with an allergic response. The invention also relates to an MSF feed and to a process for feeding with an MSF feed.

19 Claims, No Drawings

5,922,373

PROCESS FOR PREPARING A SOY PROTEIN FEED WITH ENHANCED NUTRITIONAL VALUE

BACKGROUND OF THE INVENTION

Protein is an important and required component of a balanced diet for all animals. Traditionally, milk or milk products have been used to supply young animals with protein. However, because milk products are fairly expensive, it is often difficult to include milk products in the diet of all young animals. Moreover, some animals cannot tolerate milk products that have been derived from milk from a different species of animal. Accordingly, attempts have been made to identify other, less expensive sources of protein to replace, in whole or part, the milk protein used in the diet of young animals.

Due to its low cost and availability, the soybean, primarily in the form of soy flour, has been used as a protein source in the diet of many species of young animals. Unfortunately, some species of animals, including preruminant calves, human infants, and pigs typically develop allergies to soybean products. Such allergic animals exhibit high concentrations of circulatory IgG antibodies to glycin and β-conglycinin, the two major storage proteins of soybeans. Ingestion of conventional soy flour by allergic calves typically produces digestive abnormalities including changes in the rate of movement of digesta in the abomasum and small intestine, increased gut permeability to protein macromolecules, and inflammation of the intestinal mucosa. This allergic reaction is manifested by loss of appetite, poor growth, low weight gain and diarrhea.

Efforts have been made to develop processes which remove or inactivate the allergenic components in soy products. One such process involves extracting soy flour with alcohol and water. Unfortunately this process is expensive and removes a substantial portion of the valuable carbohydrate component of the soy flour. In addition, the resulting products, which are known as soy concentrates, do not suspend well in water.

Another process involves separating the soy flour protein into multiple protein fractions. Unfortunately, this fractionation process is expensive and removes most of the carbohydrates from the resulting products, which are known as "isolates." Moreover, the isolates may still contain antigenic proteins.

Accordingly, it is desirable to have a new process which reduces the undesirable characteristics of soy flour. A process that does not remove the nutritionally valuable components from soy flour would be especially desirable. It is also desirable to have a new modified soy flour feed that does not induce diarrhea, poor growth or weight loss in the recipient animal and that is relatively inexpensive to produce.

SUMMARY OF INVENTION

The present invention provides a novel method for making a modified soy flour feed which is useful as a protein source in the diets of animals, particularly in the diet of young animals. The method for producing the modified soy flour feed, referred to hereinafter as "MSF feed", comprises the following steps: combining soy flour, sugar and liquid to provide a mixture; gelatinizing the soy flour in the mixture; then reacting yeast with the mixture preferably at a temperature of from about 60° F. to about 125° F. for a time sufficient to reduce the allergenic properties of the soy flour; and terminating the chemical reactions. Preferably, the yeast is added to the gelatinized mixture at a weight which is from about 0.25 to about 15%, by weight, of the combined soy flour-sugar weight. Unlike conventional soy flour, the MSF feed produced by this process does not induce diarrhea, poor growth or weight loss associated with an allergic response.

The invention also relates to the MSF feed which comprises a modified soy flour and yeast cell components, primarily yeast cell walls, and to the process for feeding with the MSF feed.

DETAILED DESCRIPTION OF THE INVENTION

The present invention provides a novel method for preparing a modified soy flour feed which is useful as a protein source in the diets of animals and is particularly useful for at least partially replacing milk as a protein source in the diets of young animals. As used herein and in the art of feeding animals, diet means the feedstuff or mixture of feedstuffs fed to the animal. The method for producing the modified soy flour feed, referred to as hereinafter as "MSF feed", comprises the following steps: combining soy flour, sugar and liquid to provide a mixture; gelatinizing the carbohydrate in the soy flour that is present in the mixture; then reacting the yeast with the mixture, preferably at a temperature of from about 60° F. to about 125° F., for a time sufficient to reduce the allergenic properties of the soy flour; and terminating the chemical reactions. Preferably, the soy flour and sugar are combined in a ratio of from about 9.9:0.1 to about 8.0:2.0, by weight. Preferably, the yeast is added to the gelatinized mixture at a weight which is from about 0.25 to about 25%, by weight, of the combined soy flour-sugar weight. It is believed that in the present invention the yeast partially digests portions of soy flour protein and soy flour carbohydrate. It is further believed that the digestive activity of the yeast changes the antigenic properties of some or all of the soy flour proteins, particularly the storage protein, and/or the soy flour carbohydrates.

The present invention also relates to an MSF feed produced by this novel process. The MSF feed produced by this process comprises a modified flour component, which is a modified soy flour, and components of dead yeast cells, primarily yeast cell walls. Unlike conventional soy flour, MSF feed does not induce diarrhea, poor growth or the weight loss associated with an allergic response. Thus, MSF feed is a useful addition to the diets of young domestic animals, including, for example, calves, lambs and pigs. The MSF feed is also useful as a food for humans particularly where an allergic reaction to soy flour is a problem. In addition, the MSF feed possesses better suspending and dispersing characteristics in liquids, such as water, than conventional soy flour.

Materials

The soy flour, before treatment according to the method of the present invention, is conventional soy flour. Suitable soy flour is commercially available from, for example, Archer Daniels Midland under the tradename "Nutrasoy Flour." The sugar is a monosaccharide such as, for example, glucose, galactose, and fructose; a disaccharide such as, for example, sucrose, maltose, isomaltose, maltulose and trehalose; or a trisaccharide such as, for example, melezitose, maltotriose, panose, and isopanose; a tetrasaccharide such as, for example, maltatetraose; or combinations thereof. All of the sugars are commercially available. For example, glucose and sucrose are available from Universal Foods®. The yeast is a member of the Saccharomycetaceae family, preferably *Saccharoymces cerevisiae,* that is used for making alcoholic liquors and as a leaven in baking. Such yeast is commercially available as baking yeast. Suitable malted grains include, for example, malted barley which is commercially available from, for example, Archer Daniel Midland.

Preparation of MSF Feed

A liquid, containing preferably water, is preferably heated in a vessel to preferably about 90–180° F. Soy flour and sugar are then added to the vessel. The soy flour and sugar are added in a ratio of from about 9.9:0.1 to about 8.0:2.0, by weight; preferably in a ratio of from about 9.75:0.25 to about 9.25:0.75, by weight; more preferably about 9.5:0.5 by weight. Optionally, malted grain is added to the mixture of water, soy flour and sugar to decrease the viscosity of the mixture and to facilitate complete mixing of the soy flour and sugar. The malted grain, preferably malted barley, is added at a weight of from 0% to about 10% of the soy flour weight, preferably from about 0.25% to about 10 of the soy flour weight, more preferably at about 1% by weight of the soy flour weight. The mixture is stirred at a time and temperature sufficient to obtain complete mixing, preferably at a temperature of from about 75° F. to about 122° F., more preferably about 95° to about 122° F. for from about 0.5 minutes to four hours, preferably about 5 minutes. Then the carbohydrate is gelatinized, preferably by increasing the temperature of the mixture to between about 122° F. to about 230° F., more preferably to about 180° F., and stirring for from about 30 minutes to about four hours, preferably about 1 hour. Following gelatinization, the temperature of the mixture is adjusted to a temperature which promotes yeast growth, preferably from about 60° F. to about 125° F., more preferably to about 95° F. The yeast is then added while stirring to maintain the yeast in suspension. The yeast is added at a weight of from about 0.25% to about 15%, preferably from about 1% to 15%, more preferably from about 1% to about 10% of the combined soy flour and sugar weight. The resulting mixture is vigorously stirred preferably for about 1 to 6 hours, more preferably for about 2 hours, to encourage rapid yeast growth. Then the mixture is heated for a time and temperature sufficient to kill the yeast, preferably for at least about 3 minutes preferably at 150° F., more preferably for about 0.5 hours, to provide the modified soy flour feed. If the mixture containing the yeast is stirred for less than 2 hours, it is preferred that the mixture be allowed to sit for an additional 2 to 3 hours before heating. The resulting product is an MSF feed having reduced allergenic properties. The MSF feed also disperses and suspends well in liquids such as, for example, water or milk. Thus, the MSF feed is well-suited for feeding animals, such as calves, lambs, and infants, that rely primarily on sucking to ingest their food.

If desired, the MSF feed is dried for storage or transportation. Dried MSF feed is preferably rehydrated with water before it is fed to an animal.

Preferably, conventional nutrients are mixed with the MSF feed to form a nutritionally complete diet, as desired. The MSF feed is added from about 0.5 to 50%, preferably from about 5 to 30%, more preferably from about 10% to 20% of the total diet weight.

While the preparation of the MSF feed has been described as involving stirring, it is to be understood that other conventional mixing methods which combine the ingredients are suitable.

EXAMPLES

In each of the following examples the MSF feed was prepared in a steam-heated, double walled stainless steel vessel from Patterson and Sons in Ashland, Ohio. The vessel has a capacity of 200 lbs and is equipped with a ¾ inch hand drill from Makita, Inc., to which a paddle stirrer has been attached.

In each of the following examples, the malted barley flour, which was a low fiber, high diastase, malted barley flour, was obtained from Archer Daniel Midland. The soy flour was obtained from Archer Daniel Midland under the trade name "Nutrasoy flour". The glucose, also referred to as dextrose, was obtained from Universal Foods, Milwaukee, Wis. The yeast was baking yeast obtained from Smith's Bulk Food, Dalton, Ohio. The sucrose was also obtained from Smith's Bulk Foods. The wheat flour was a non-iron fortified wheat flour available under the trade name "Occident" from Con Agra®.

Example 1

Twenty-three grams of malted barley, which is 1% of the soy flour weight, were added to a vessel containing 150 lbs of water at 95° F. while stirring. About 5 lbs of soy flour and 0.26 lbs of sucrose were added and the mixture was stirred at 95° F. for 5 minutes. With constant stirring, the temperature of the mixture was increased to 180° F. The mixture was maintained at a temperature of about 180° F. and stirred for about 1 hour. The temperature of the mixture was then reduced to 100° F. Then 45 grams of yeast, which is 2% by weight of the soy flour weight, was added and the mixture stirred for about 2 hours. The mixture was heated to 140° F. over a period of 15 minutes to kill the yeast and to provide the MSF feed.

The MSF feed was mixed with the other dietary ingredients listed in Table 1 and additional water added to bring the diet weight to 200 lbs. The temperature of the completed diet was then reduced to 104° F., the temperature for feeding to calves.

Example 2

Nineteen grams of malted barley was added to a vessel containing 150 lbs of water at 95° F. while stirring. About 4.17 lbs of soy flour and 0.21 lbs of sucrose were added and the mixture was stirred at 95° F. for 5 minutes. With constant stirring, the temperature of the mixture was increased to 180° F. The mixture was maintained at a temperature of about 180° F. and stirred for about 1 hour. The temperature of the mixture was then reduced to 100° F. Then 38 grams of yeast, which is 2% by weight of the soy flour weight, was added and stirred for about 2 hours. The mixture was heated to 140° F. over a period of 15 minutes to kill the yeast cells and to provide the MSF feed The MSF feed was mixed with other dietary ingredients as listed in Table 1 and additional water added to bring the diet weight to 200 lbs. The temperature of the completed diet was then reduced to 104° F., the temperature for feeding to calves.

Example 3

Thirty grams of malted barley was added to a vessel containing 150 lbs of water at 95° F. while stirring. About 6.64 lbs of soy flour and 0.33 lbs of dextrose were added and the mixture was stirred at 95° F. for 5 minutes. With constant stirring. the temperature of the mixture was increased to 180° F. The mixture was stirred for about 1 hour while the temperature was maintained at 180° F. The temperature of the mixture was then reduced to 100° F. Then 60 grams of yeast, which is 2% by weight of the soy flour weight, was added and stirred for about 2 hours. The mixture was heated to 140° F. over a period of 15 minutes.

The MSF feed was mixed with other dietary ingredients as listed in Table 1 and additional water added to bring the diet weight to 200 lbs. The temperature of the completed diet was then reduced to 104° F., the temperature for feeding to calves.

Example 4

Fourteen grams of malted barley was added to a vessel containing 150 lbs of water at 95° F. while stirring. About 2.98 lbs of soy flour and 0.14 lbs of dextrose were added and the mixture was stirred at 95° F. for 5 minutes. With constant stirring, the temperature of the mixture was increased to 180° F. The mixture was maintained at a temperature of 180° F. and stirred for about 1 hour. The temperature of the mixture was then reduced to 100° F. Then 27 grams of yeast, which is 2% by weight of the soy flour weight, was added and stirred for about 2 hours. The mixture was heated to 140° F. over a period of 15 minutes to kill the yeast cells and to provide the MSF feed.

The MSF feed was mixed with other dietary ingredients as listed in Table 1 and additional water added to bring the diet weight to 200 lbs. The temperature of the completed diet was then reduced to 104° F., the temperature for feeding to calves.

Example 5

Thirty-four grams of malted barley was added to a vessel containing 150 lbs of water at 95° F. while stirring. About 7.59 lbs of soy flour and 0.38 lbs of sucrose were added and the mixture was stirred at 95° F. for 5 minutes. With constant stirring, the temperature of the mixture was increased to 180° F. The mixture was maintained at 180° F. and stirred for about 1 hour. The temperature of the mixture was then reduced to 100° F. Then 64 grams of yeast cells, which is about 2% of the soy flour weight, was added and the mixture stirred for about 2 hours. The mixture was heated to 140° F. over a period of 15 minutes to kill the yeast cells and to provide the MSF feed.

The MSF feed was mixed with other dietary ingredients as listed in Table 1 and additional water added to bring the diet weight to 200 lbs. The temperature of the completed diet was then reduced to 104° F., the temperature for feeding to calves.

Example 6

Twenty-seven grams of malted barley was added to a vessel containing 150 lbs of water at 95° F. while stirring. About 5.97 lbs of soy flour and 0.30 lbs of sucrose were added and the mixture was stirred at 95° F. for 5 minutes. With constant stirring, the temperature of the mixture was increased to 180° F. The mixture was maintained at 180° F. and stirred for about 1 hour. The temperature of the mixture was then reduced to 100° F. Then 54 grams of yeast, which is 2% of the soy flour weight, was added and the mixture stirred for about 2 hours. The mixture was heated to 140° F. over a period of 15 minutes to kill the yeast cells and to provide the MSF feed.

The MSF feed was mixed with other dietary ingredients as listed in Table 1 and additional water added to bring the diet weight to 200 lbs. The temperature of the completed diet was then reduced to 104° F., the temperature for feeding to calves.

Evaluation of MSF Calf Feed

The diets prepared as described in examples 1–6 were stable with very little precipitate upon standing for at least ten minutes. In contrast, diets which were prepared in the same manner but without the addition of sugar to the soy flour formulation were not as stable, with a substantial amount of soy flour precipitating to the bottom of the container in less than 2 minutes.

The severity and duration of the reaction of the calf to soy flour is greater than for most other species. Thus the calf is a sensitive indicator of the allergenic properties which are in a modified soy flour product. To evaluate the MSF feeds produced as described in examples 1–6, 24 Holstein bull calves with an average weight of 98.36 lbs were randomly assigned to three treatment groups. These calves were probably from about one day to about three days in age. Upon arrival the calves were fed only water. Six hours following the feeding of water, eight of the calves were fed Diet C44, which provided 35% of its dietary protein from MSF feed, and eight of the calves were fed Diet C45, which provided 25% of its dietary protein from MSF feed.

Eight of the calves were fed comparative diet C31, which provided 25% of its dietary protein from a modified soy-flour wheat flour feed, referred to hereinafter as "MSWF feed". MSWF feed comprises a modified soy flour component, and was prepared by a process as described in U.S. Pat. No. 5,565,225. In contrast to the process of 5,565,225, the present method does not require addition of wheat flour and malted grain to the soy flour, and is more streamlined and less time-consuming than the process of 5,565,225.

After the initial feeding the calves were fed twice daily at 12 hour intervals (7 a.m. and 7 p.m.) with a gradual transition from the starter to the finisher diet. Amounts of the diets fed at each feeding were increased from 3.5 lbs containing 10.7% solids on day 1 to 19.25 lbs containing 19.9% solids on day 127. Diets C44 and C45 were fed to calf groups A and B, respectively, for the 127 day trial while diet C31 was fed to calf group C for the first 57 days then changed to diet C46 until day 83 followed by diet C45 to day 127. Calf group C was changed from diet C31 to diet C46 to determine the effect of changing to a diet in which 50% of the dietary protein was provided by MSF feed. This diet proved to be unpalatable to the calves. Therefore, the animals in Group C were changed to diet C45 at day 83 and were continued on diet C45 until the trial was terminated. Diet formulations with their estimated nutrient content are shown in Table 1.

TABLE 1

Composition of diets

% DM

| | Comparative Diet C-31 | | Diet C-44 | |
|---|---|---|---|---|
| | | | Starter Example | Finisher Example |
| Ingredient | Starter | Finisher | 1 | 2 |
| MWSF Feed | 12.10 | 8.68 | 0.0 | 0.0 |
| MSF Feed | 0.0 | 0.0 | 14.36 | 10.99 |
| Whey protein concentrate | 26.0 | 3.63 | 17.6 | 0.0 |
| Lactose | 0.0 | 0.0 | 0.0 | 3.27 |
| Whey | 24.13 | 43.43 | 29.08 | 41.62 |
| 13/60 | 34.67 | 40.5 | 35.7 | 40.25 |
| Premix | .5 | .5 | .5 | .5 |
| Dical | 2.27 | 2.38 | 2.32 | 2.49 |
| Limestone | .32 | .59 | .26 | 0.0 |
| Lysine | 0.0 | 0.0 | 0.0 | .59 |
| Methionine | .18 | .29 | .18 | .30 |

TABLE 1-continued

Composition of diets

% DM

|  | Comparative Diet C-31 | | Diet C-44 | |
|---|---|---|---|---|
|  | Starter | Finisher | Starter Example 1 | Finisher Example 2 |
| Ingredient |  |  |  |  |
| Calculated analysis |  |  |  |  |
| DM, % | 100 | 100 | 100.0 | 100 |
| Protein, % | 22.07 | 16.08 | 22.13 | 16.15 |
| Lactose % | 36.48 | 39.6 | 35.84 | 39.73 |
| ME, kcal/lb | 1946 | 1948 | 1950 | 1943 |
| Fat, % | 21.58 | 24.49 | 22.07 | 24.48 |
| Lysine, % | 1.57 | 1.49 | 1.56 | 1.51 |
| Methionine, % | .53 | .51 | .53 | .52 |
| Calcium, % | 1.04 | 1.02 | 1.06 | 1.01 |
| Phosphorous, % | .85 | .85 | .85 | .85 |

TABLE 1A

Composition of diets

% DM

|  | Diet C-45 | | Diet C-46 | |
|---|---|---|---|---|
|  | Starter Example 3 | Finisher Example 4 | Starter Example 5 | Finisher Example 6 |
| Ingredient |  |  |  |  |
| MSF Feed | 10.25 | 7.85 | 21.59 | 15.71 |
| Whey protein concentrate | 24.76 | 3.13 | 6.7 | 0.0 |
| Lactose | 0.0 | 0.0 | 0.0 | 17.36 |
| Whey | 26.77 | 44.54 | 31.10 | 23.83 |
| 13/60 | 35.15 | 40.72 | 37.41 | 38.56 |
| Premix | .5 | .5 | .5 | .5 |
| Dical | 2.16 | 2.38 | 2.59 | 3.13 |
| Limestone | .32 | 0.0 | 0.0 | 0.0 |
| Lysine | 0.0 | .59 | 0.0 | .6 |
| Methionine | .09 | .29 | .11 | .31 |
| Calculated analysis |  |  |  |  |
| DM, % | 100 | 100 | 100 | 100 |
| Protein, % | 22.01 | 16.07 | 22.20 | 16.01 |
| Lactose, % | 37.71 | 40.16 | 32.41 | 41.33 |
| ME, kcal/lb | 1951 | 1945 | 1948 | 1952 |
| Fat, % | 21.84 | 27.34 | 22.96 | 23.43 |
| Lysine, % | 1.62 | 1.56 | 1.48 | 1.01 |
| Methionine, % | .53 | .52 | .32 | .53 |
| Calcium, % | 1.04 | 1.03 | 1.00 | 1.00 |
| Phosphorous, % | .85 | .87 | .85 | .85 |

Results from previous trials in which a contemporary commercial veal diet was fed ("Star melk", from NRV, Inc., Ixonia, Wis.) to Holstein bull calves of similar weight and age was used to evaluate the performance of the diets which were fed to calves in this trial. The results obtained when these diets were fed to the animals are shown in Table 2. When measured by both rate of growth and meat quality, calf groups A and B performed well when fed diets in which a major portion of their protein was provided by MSF.

TABLE 2

Summary of results obtained with diets containing the MSF feed of examples 1–6.

| Calf group | Treatment | Avg. Beginning wt lb | Time intervals, days | |
|---|---|---|---|---|
|  |  |  | 1–27 | 27–55 |
| A. | Diet C44 35% of protein as MSF | 103.5 ± 2.87 | 1.05 ± .37 | 2.81 ± .05 |
| B. | Diet C45 25% of protein as MSF | 95.75 ± 2.64 | 1.18 ± .09 | 2.87 ± .02 |
| C. | Comparative Diet C31 fed days 1–57; Diet C46 fed days 57–83; Diet C45 fed days 8.3–127 | 95.38 ± 1.63 | 1.11 ± .06 | 2.89 ± .04 |

| Calf group | Treatment | Avg. Beginning wt lb | Time intervals, days 55–127 | Avg. 127 day wt lb |
|---|---|---|---|---|
| A. | Diet C44 35% of protein as MSF | 103.5 ± 2.87 | 3.64 ± .15 | 472.25 ± 13.95 |
| B. | Diet C45 25% of protein as MSF | 95.75 ± 2.64 | 3.64 ± .11 | 476.0 ± 9.99 |
| C. | Comparative Diet C31 fed day 1–57 Diet C46 fed day 57–83 Diet C45 fed day 83–127 | 95.38 ± 1.63 | 3.28 ± .12 | 445.15 ± 9.7 |

*Standard error of the mean.
*One Calf removed from Trial d 120, reticular groove failed to close properly.

Preparation of Enhanced MSF Feed

Optionally, to increase the carbohydrate content of the MSF feed, a starch filler such as, for example, wheat flour, cornstarch, barley flour, or potato starch is added to the soy-flour containing mixture during preparation of the MSF feed. Preferably, the starch filler is added to the mixture of liquid, soy flour and sugar during the initial step of the preparation. The filler is added at a weight of from 0% to about 75%, preferably 1%–25%, more preferably from about 5% to about 25% of the combined soy flour-sugar weight. The mixture is then gelatinized and reacted with yeast. From about 0.5 to 4.0 hours, preferably at about 2 hours after the addition of yeast, malted grain, preferably malted barley, is added to the mixture. The malted grain is added at a weight of about 0% to 15%, preferably about 5% to 10%, by weight of the combined soy flour and sugar weight. The mixture is then heated, preferably at a temperature of from about 140° F. to about 160° F., preferably at 150° F. for at least 3 minutes, preferably for about 0.5 hours to kill the yeast and to allow for digestion of the wheat flour carbohydrate. The resulting product is an enhanced MSF feed having additional carbohydrate.

Example 7

Twenty-three grams of malted barley was added to a vessel containing 150 lbs of water at 95° F. while stirring. About 4.99 lbs of soy flour and 0.25 lbs of dextrose and 1.93 lbs of wheat flour were added and the mixture was stirred at 95° F. for 5 minutes. With constant stirring, the temperature of the mixture was increased to 180° F. The mixture was stirred for about 1 hour while the temperature was maintained at 180° F. The temperature of the mixture was then reduced to 95° F. and 45 grams of yeast, which is 2% by weight of the soy flour weight, was added. The mixture was stirred for about 2 hours. Forty-four grams of malted barley flour which is 5% of the soy flour weight was added. The mixture was heated to 150° F. over a period of 15 minutes and maintained at this temperature for 30 minutes to kill the yeast and to allow for digestion of the wheat flour carbohydrate.

The enhanced MSF feed was mixed with the other dietary ingredients listed in Table 3 for diets C51 and C52, and additional water added to bring the diet weight to 200 lbs. The temperature of the completed diet was then reduced to 104° F., the temperature for feeding to calves.

Example 8

Nineteen grams of malted barley was added to a vessel containing 150 lbs of water at 120° F. while stirring. About 4.27 lbs of soy flour, 2.16 lb. of wheat flour and 0.21 lbs of sucrose were added and the mixture was stirred at 120° F. for 5 minutes. With constant stirring the temperature of the mixture was increased to 180° F. The mixture was maintained at a temperature of 180° F. and stirred for about 1 hour. The temperature of the mixture was then reduced to 95° F., then 39 grams of yeast, which is 2% by weight of the soy flour weight, was added and the mixture stirred for about 2 hours. Then, forty-nine grams of malted barley flour was added. The mixture was heated to 150° F. over a period of 15 minutes and maintained at this temperature for 30 minutes to kill the yeast cells and to allow for digestion of the wheat flour carbohydrate.

The enhanced MSF feed was mixed with other dietary ingredients listed in Table 3 for diets C51 and C52, and additional water added to bring the diet weight to 200 lbs. The temperature of the completed diet was then reduced to 104° F., the temperature for feeding to calves.

To evaluate the enhanced MSF feeds produced as described in examples 7–8, eighteen Holstein bull calves with an average weight of 114.33 lbs were randomly assigned to two treatment groups. These calves were from about one day to about three days in age. Upon arrival the calves were fed only water. Six hours following the feeding of water, the calves were fed a commercial diet or diets C51 and C52 whose composition is shown in Table 3. Diets C51 and C52 provided 35% of their dietary protein from the enhanced MSF feed of examples 7 and 8. After the initial feeding the calves were fed twice daily at 12 hour intervals (6:30 a.m. and 6:30 p.m.) with a gradual transition from the starter to the finisher diet. Amounts of the diets fed at each feeding were increased from 3.5 lbs containing 10.7% solids on day 1 to 19.0 lbs containing 19.9% solids on day 126. Diet C52 was fed to calf group B for the entire 126 day trial. Diet C51 was fed to calf group C for the first 76 days of the trial. The diet formulations of Diets C51 and C52 with their estimated nutrient content are shown on Table 3.

TABLE 3

Composition of diets[a]

| Ingredient | Diet C-51 Starter Example 7 | Diet C-51 Finisher Example 8 | Diet C-52 Starter Example 7 | Diet C-52 Finisher Example 8 |
|---|---|---|---|---|
| MSF Feed (enhanced) | 19.36 | 15.99 | 19.36 | 15.99 |
| Whey protein concentrate | 39.28 | 14.78 | 18.69 | — |
| Lactose | 20.9 | 9.61 | 2.31 | 4.82 |
| Whey | — | 35.75 | 20 | 35.75 |
| 13/60 | — | — | 34.93 | 39.25 |
| Blended fat | 14.93 | 18.0 | — | — |
| Centromix-E | 1.49 | 3.3 | — | — |
| Premix | .5 | .5 | .5 | .5 |
| Dical | 3.08 | 2.46 | 3.13 | 2.76 |
| Limestone | .32 | — | .23 | — |
| Lysine | — | .35 | .56 | .64 |
| Methionine | .14 | .26 | .29 | .29 |
| Calculated analysis | | | | |
| DM, % | 100 | 100 | 100 | 100 |
| Protein, % | 22.08 | 16.03 | 21.99 | 16.03 |
| Lactose, % | 40.93 | 41.81 | 32.34 | 37.09 |
| ME, kcal/lb | 1946 | 1953 | 1938 | 1943 |
| Fat, % | 15.93 | 18.66 | 21.37 | 23.9 |
| Lysine, % | 1.71 | 1.49 | 1.50 | 1.49 |
| Methionine, % | .53 | .51 | .53 | .51 |
| Calcium, % | 1.04 | .98 | 1.04 | 1.01 |
| Phosphorous, % | .88 | .85 | .85 | .85 |

[a] Commercial veal feed guaranteed analysis: starter-protein crude not less than 22%, finisher not less than 16%; starter and finisher: crude fat not less than 18%; crude fiber, not more than .15%, Vitamin A not less than 20,000 I.U./lb, Vitamin $D_3$ not less than 5,000 I.U./lb; Vitamin E, not less than 30 I.U./lb.

Calves were individually weighed and blood samples taken. The trial was terminated and the calves slaughtered on day 126. The results are shown in Table 4.

TABLE 4

Summary of calf weights and weight gain for calves fed Enhanced MSF Feed.

| Treatment | Average Beginning wt lb | 1–21 days | 22–56 days | 57–126 days |
|---|---|---|---|---|
| | | Average Daily Weight Gain, lb ± SEM | | |
| Group A Commercial diet | 117.83 ± 4.66 | .74 ± .16 | 2.70 ± .05 | 3.48 ± .09 |
| Group B Diet C51 fed days 1–76 Diet C52 fed days 77–126 | 114.2 ± 4.70 | .6.1 ± .07 | 2.69 ± .04 | 3.63 ± .07 |
| Group C Diet C52 fed days 1–126[d] | 113.6 ± 7.15 | 0.81 ± 0.23 | 2.66 ± .09 | 3.90 ± 0.08 |

| Treatment | Average 126 day wt[b,c] lb |
|---|---|
| Group A Commercial Diet | 467.5 ± 8.45 |
| Group B Diet C51 fed days 1–76 Diet C52 fed days 77–126 | 471.0 ± 6.88 |
| Group C Diet C52 fed days | 489.6 ± 4.5 |

TABLE 4-continued

Summary of calf weights and weight gain for calves fed Enhanced MSF Feed.
1–126[d]

[a] Standard error of the mean.
[b] Feed/gain: A. 1.84; B. 1.82; C. 1.73
[c] Hot yield, %: A. 67.8; B. 66.28; C. 67.68
[d] One calf died d 12. Probable cause was dehydration due to cryptosporidosis The eighteen week performance of calves fed a diet which included the enhanced modified soy flour feed of examples 7 and 8 was as follows: average calf weight 489.6 lbs; ADG 2.98 lb/d, lb feed/lb gain 1.73, hot yield (hide on) 67.23%, carcasses color 1 or 2, all of which is deemed acceptable. These results indicate that an enhanced MSF feed prepared in accordance with the present method are useful protein sources in the diet of animals, particularly young animals.

Although certain embodiments of this invention have been shown and described, various adaptations and modifications can be made without departing from the scope of the invention as defined in the appended claims.

What is claimed is:

1. A method for producing a modified soy flour feed comprising the following steps in sequential order:
   (a) combining soy flour, sugar, and water to provide a mixture;
   (b) gelatinizing the carbohydrate in the soy flour of the mixture;
   (c) reacting the gelatinized mixture of step (b) with an effective amount of the yeast to reduce the allergenic properties of the soy flour;
   (d) terminating the chemical reaction of step (c) to provide a modified soy flour feed having reduced allergenic properties.

2. The method of claim 1 wherein the mixture comprises soy flour and sugar in a ratio of from about 8:2 to about 9.9:0.1 by weight; and
   wherein the yeast of step (c) is present in the reaction mixture at a weight of from about 0.25% to about 15% of the combined soy flour-sugar weight.

3. The method of claim 2 further comprising the step of combining malted grain with the soy flour, sugar, and water to provide the mixture of step (a).

4. A modified soy flour feed prepared by the method of claim 2.

5. The method of claim 1 further comprising the step of combining malted grain with the soy flour, sugar, and water to provide the mixture of step (a).

6. The method of claim 5 wherein the mixture of step (a) comprises malted grain at a weight of from about 0.25% to about 10% by weight of the soy flour weight.

7. The method of claim 5 wherein the malted grain comprises malted barley.

8. A modified soy flour feed prepared by the method of claim 5.

9. The method of claim 1 wherein the chemical reaction is terminated by heating the mixture for a time and at a temperature sufficient to kill the yeast cells.

10. The method of claim 9 wherein a starch filler is added to the mixture of step (a); and
    further comprising a step of adding malted grain to the gelatinized mixture after step (c) and before step (d).

11. The method of claim 10 wherein the starch filler is added at a weight of from about 5% to about 75% by weight of the combined soy flour and sugar weight.

12. The method of claim 11 wherein the starch filler is wheat flour and the malted grain is malted barley.

13. A method of feeding an animal comprising the following steps:
    a. providing the modified soy flour feed of claim 11; and
    b. feeding the modified soy flour feed to the animal.

14. The method of claim 1 wherein the carbohydrate in the soy flour is gelatinized by heating the mixture to a temperature of between about 122° F. to about 230° F.

15. The method of claim 1 wherein the yeast is reacted with the gelatinized soy flour mixture at a temperature of between about 60° F. to about 120° F.

16. A modified soy flour feed having reduced allergenic properties comprising: soy flour and yeast cell components, said soy flour feed prepared by the method of claim 1.

17. The modified soy flour feed of claim 16 further comprising malted grain at a weight of from about 0.25% to about 25% of the soy flour weight.

18. The modified soy flour feed of claim 17 wherein the malted grain is malted barley.

19. The modified soy flour feed of claim 16 wherein the modified soy flour feed is free of wheat flour.

\* \* \* \* \*